Patented Mar. 23, 1937

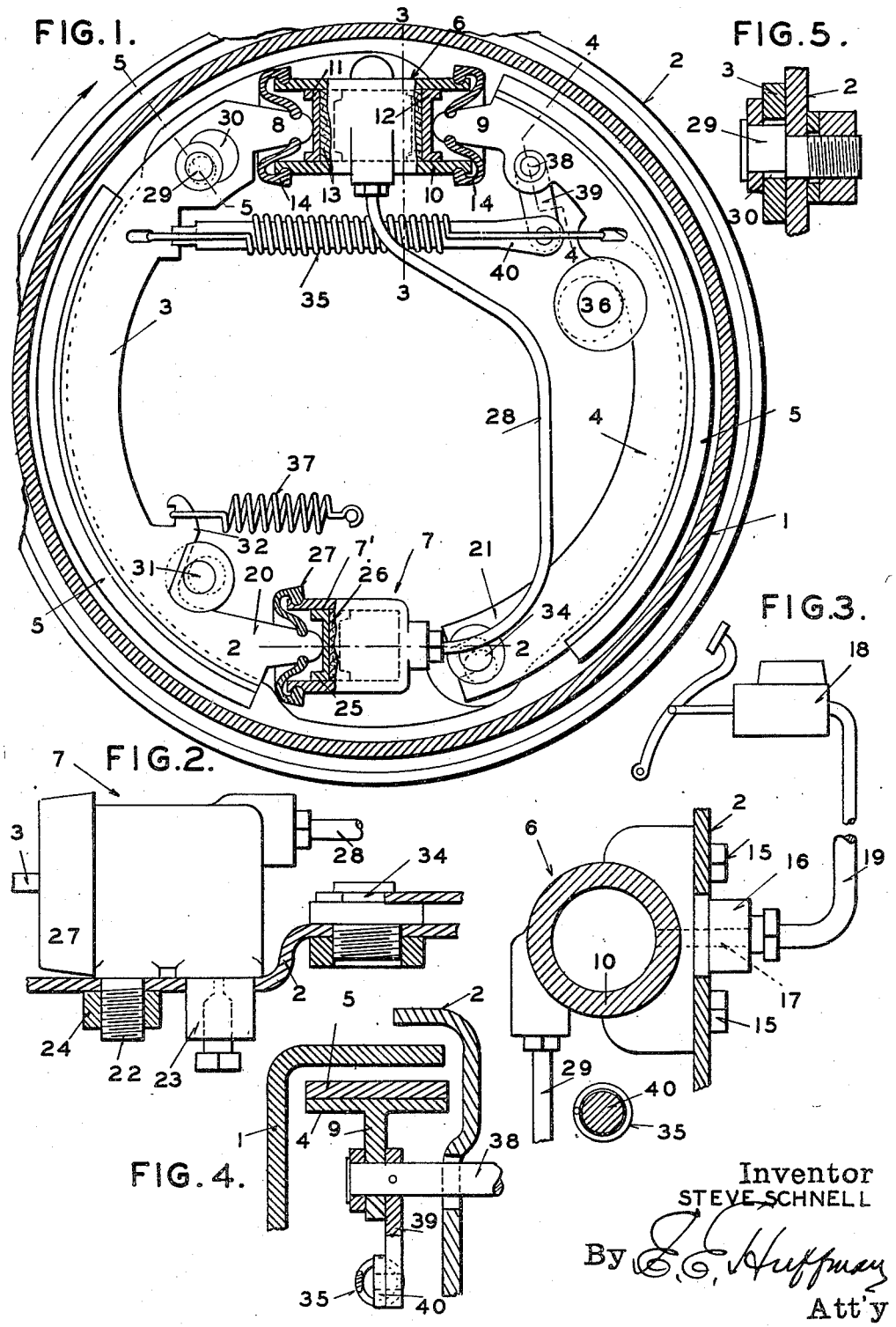

2,074,434

UNITED STATES PATENT OFFICE 2,074,434

BRAKING MECHANISM

Steve Schnell, Overland, Mo., assignor to Wagner Electric Corporation, St. Louis, Mo., a corporation of Delaware Application September 1, 1934, Serial No. 742,363

1 Claim. (Cl. 188—106)

My invention relates to braking mechanism for motor vehicles and more particularly to a two-shoe internal brake in which a plurality of simultaneously operable actuators are employed to engage the shoes with the brake drum.

One of the objects of my invention is to construct a brake of the type referred to in which the shoes are positioned in end to end relation and in which the shoes are actuated at diametrically opposite ends and anchored at the other ends when the brake is applied and the drum is rotating in one direction, and in which the shoes are actuated at one pair of adjacent ends and anchored at the other ends when the brake is applied and the drum is rotating in the opposite direction.

Another object of my invention is to provide a brake of the type described with a pair of simultaneously-actuated fluid pressure means for actuating the brake shoes.

Still another object of my invention is to provide said brake with auxiliary mechanical actuating means.

A further object of my invention is to produce a two-shoe brake having a plurality of simultaneously operable actuating fluid motors which is simple in construction, economical to manufacture, and highly efficient in operation.

Other objects of my invention will become apparent from the following description taken in connection with the accompanying drawing in which Figure 1 is a side view, partly in section, of a two-shoe brake embodying my invention; and Figures 2, 3, 4 and 5 are cross-sectional views taken on the lines 2—2, 3—3, 4—4, and 5—5, respectively, of Figure 1.

Referring in detail to the drawing, the numeral 1 indicates the brake drum secured to a wheel of the motor vehicle and which is enclosed at its open side by the backing plate 2 secured to some fixed part of the vehicle in the usual manner. A pair of brake shoes 3 and 4 are positioned within the drum in end to end relation, the shoes being provided with brake linings 5 to provide an engaging surface for cooperation with the inner surface of the drum.

The actuating means for the brake drum comprises two separate hydraulically-actuated motors 6 and 7. The hydraulic motor 6 is interposed between the adjacent ends 8 and 9 of the shoes 3 and 4, respectively, and comprises a cylinder 10 in which is positioned a pair of oppositely moving pistons 11 and 12, all of well known construction. The piston 11 is adapted to cooperate with the end 8 of the shoe 3 and the piston 12 is adapted to cooperate with the end 9 of the shoe 4. The pistons are provided with suitable packing cups 13 and the ends of the cylinder carry dust boots 14.

The cylinder 10 is secured to the backing plate 2 by means of bolts 15 or other suitable means. This cylinder has formed thereon a boss 16 extending through the backing plate, which boss is provided with an inlet passage 17 by which the usual hydraulic compressor 18 is connected with the interior of the cylinder by a conduit 19.

The hydraulic motor 7 comprises a cylinder 7' whose piston 25 actuates the end 20 of shoe 3. The cylinder 7' is secured to the backing plate 2 by means of a pair of extensions 22 and 23, one of which is threaded for cooperation with a nut 24 to clamp the cylinder to the backing plate and the other with the usual bleeder valve. The piston 25 is provided with the usual packing cup 26 and the cylinder end carries a dust boot 27.

The hydraulic motor 6 is interconnected with the hydraulic motor 7 by means of a conduit 28, thereby providing free communication between the two motors whereby the pistons of each motor are simultaneously subjected to equal fluid pressure per unit area.

The shoe 3 of the brake is provided with an anchor at each end, the anchor for the end 8 comprising a pin 29 eccentrically mounted in the backing plate and extending through a suitable opening 30 in the web of the shoe 3. The anchor for the end 20 of the shoe 3 also comprises a pin 31 eccentrically mounted in the backing plate and cooperating with a suitable shoulder 32 on the web. The anchor pin 31 is employed for adjusting the shoe 3 about the anchor pin 29 to compensate for wear of the shoe lining. The pin 29 is eccentric primarily for initially adjusting the shoe when first assembled.

The end 21 of the web of the shoe 4 has formed therein an open-ended slot 33 in which is positioned an anchor pin 34 eccentrically mounted in the backing plate 2 for permitting initial adjustment of the shoe 4. The pin 34 not only serves as an anchor but also forms a pivot about which the shoe 4 is capable of being rotated when the shoe is actuated into engagement with the drum by means of the piston 12 of the hydraulic motor 6.

The adjacent ends 8 and 9 of the shoes are normally maintained in retracted position by means of a coil spring 35 having its ends connected to the shoes. The retracted position of the shoe 4 is determined by means of the stop 36 and that of the shoe 3 by means of the anchor pin 29. The stop 36 is adjustably mounted in the backing plate for adjusting the shoe 4 to compensate for lining wear in a well known manner. The end 20 of shoe 3 which is actuated by the hydraulic motor 7 is normally maintained in retracted position against the anchor pin 31 by means of a spring 37, one end of which is connected to the brake shoe and the other to the backing plate.

In addition to the hydraulic motors for actuating the brake shoes an auxiliary mechanical actuating device is also provided for expanding the ends 8 and 9 of the shoes, whereby the brake may also be utilized as a parking brake for the vehicle or for emergency application. This device comprises a shaft 38 journaled in the end 9 of shoe 4 and extending through an enlarged opening in the backing plate for rotation by suitable means well known in the brake art. The shaft 38, adjacent its journal in the end 9 of the shoe, has secured thereto an arm 39 to which is pivotally connected one end of the rod 40 extending through the coils of the retracting spring 35 and having its other end abutting the end 8 of shoe 3.

The operation of my improved brake is as follows: When the drum is rotating in the direction of the arrow, which may be considered the forward direction of the vehicle, and the compressor 18 is actuated to simultaneously apply pressure to the liquid in the hydraulic motors 6 and 7, the ends 8 and 9 of shoes 3 and 4, respectively, will be moved into engagement with the drum as will also be the other end 20 of shoe 3. When the shoes engage the drum they will have a tendency to be carried with the drum and the shoe 3 will, therefore, anchor against the pin 29 and the shoe 4 against the pin 34. Since the anchors for each shoe are located at the remote end with respect to the direction of rotation of the drum, the maximum braking properties of each shoe is utilized and there is thus produced a two-shoe brake of the highest efficiency for the direction of rotation of the drum shown by the arrow.

When the brake is rotating in the direction opposite that indicated by the arrow and the shoes are applied to the drum by means of the hydraulic motors, the shoe 3 will anchor on the pin 31 and the shoe 4 will be held in engagement with the drum and against its anchor pin 34 by means of the piston 12. Under these circumstances the brake operates in the same manner as the ordinary two-shoe brake in which two of the adjacent ends of the shoes are expanded and the other adjacent ends are anchored. Under these conditions the shoe 4 will not transfer any actuating force through the hydraulic motor 6 to the end 8 of shoe 3.

When the mechanical actuating device is employed to operate the brakes in either direction of rotation of the drum, rotation of the shaft 38 will move the ends 8 and 9 of the shoes into engagement with the drum, the shoes pivoting about the anchors 31 and 34. Under these circumstances the brake operates in the same manner as the ordinary two-shoe brake in which a pair of adjacent ends are expanded and the other pair are pivoted to the backing plate.

From the foregoing description it will be readily seen that I have constructed a very simple and economical brake of the two-shoe type in which the shoes are capable of producing their maximum braking efficiency when the drum is rotating in one direction, preferably the forward direction of the vehicle, in which direction such maximum efficiency is desired, and in which the brake operates as an ordinary two-shoe brake in the opposite direction of rotation, which would be the rearward direction of the vehicle, in which direction it is not necessary to have as highly efficient a brake as in the forward direction of the vehicle.

Having fully described my invention, what I claim as new and desire to secure by Letters Patent of the United States is:

In braking mechanism, the combination of a support, a rotatable brake drum, a pair of brake shoes within the drum and positioned in end to end relation, actuating means for expanding a pair of adjacent ends of the shoes into engagement with the drum, means operable simultaneously with said expanding means for actuating the other end of one of said shoes into engagement with the drum, means carried by the support for anchoring the unactuated end of the other shoe and the diametrically opposite end of the first named shoe when the drum is rotating in one direction and the brake is applied, means carried by the support for anchoring the other end of the first named shoe when the drum is rotating in the opposite direction and the brake is applied, and auxiliary means for expanding the said pair of adjacent ends of the shoes.

STEVE SCHNELL.